G. W. DOVER.
PIN.
APPLICATION FILED MAR. 20, 1909.
Reissued May 11, 1909.
12,954.
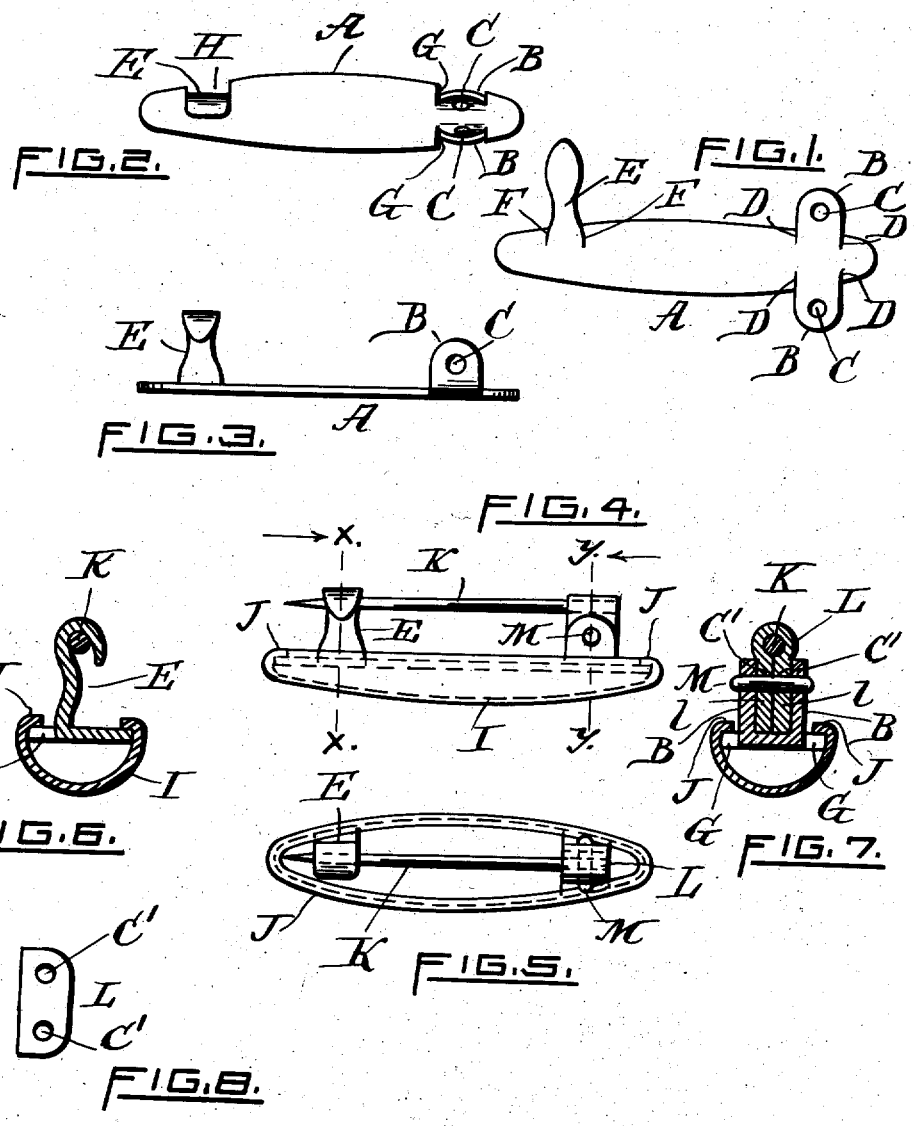
WITNESSES.
C. T. Hannigan.
George H. McLaughlin.
INVENTOR.
George W. Dover
By Horatio E. Bellows
Attorney.

UNITED STATES PATENT OFFICE.

GEORGE W. DOVER, OF CRANSTON, RHODE ISLAND.

PIN.

No. 12,954. Specification of Reissued Letters Patent. Reissued May 11, 1909.

Original No. 896,810, dated August 25, 1908, Serial No. 422,073. Application for reissue filed March 20, 1909. Serial No. 484,994.

*To all whom it may concern:*

Be it known that I, GEORGE W. DOVER, a citizen of the United States, residing at Cranston, in the county of Providence and State of Rhode Island, have invented certain new and useful Improvements in Pins, of which the following is a specification.

My invention relates to pins, but more particularly to what are commonly known as cuff pins, and has for its objects the ends commonly sought by such structures, but more particularly to increase the strength of the article and prevent the cramping of the pin pivot, and facilitate the introduction of the latter into the ears; also to simplify, cheapen, and strengthen the tongue head, and to prevent distention of the journal ears by the tongue head.

To the above ends essentially my invention consists in the novel construction and combinations of parts hereinafter set forth and claimed.

In the drawings which constitute a part of my invention, Figure 1 is a plan view of the original planchet. Fig. 2, a like view of the same with the marginal projections upturned. Fig. 3, a side elevation of the same. Figs. 4 and 5, side and top plan views respectively of the entire pin. Figs. 6 and 7, sections on lines $x$—$x$ and $y$—$y$ respectively of Fig. 4, and Fig. 8, a plan of the blank from which the tongue head is formed.

Like reference characters indicate like parts throughout the views.

My pin is constructed as follows:

A blank or planchet A, nearly elliptical in general outline, is cut from a thin sheet of metal. Near one end of the blank are oppositely disposed lateral lugs, B B each provided with a perforation C. The margins of the blank adjacent the ears are transversely cut an equal distance, these inwardly directed incisions, D D forming a part of the margins of the lugs, B B. Near the other end of the planchet is a lateral ear, E, which extends inwardly from the margin of the planchet by virtue of transverse incisions, F F of equal length, all as shown in Fig. 1. The lugs or ears, B, are then upturned with their sides in inclined planes; and the ear, E, is also upwardly bent, as shown in Figs. 2 and 3, to form a catch. By virtue of the incisions, D and F, it will be noted that the ears B and E, rise from points in from the margin of the blank or plate A, leaving marginal cavities or spaces, G G in the plate adjacent the ears, B, and a marginal cavity, H, adjacent the catch, E. The base plate, A, is secured in an oblong cupped front plate, I, by rolling the margin J, of the latter over the margin of the plate, A, at every point.

K represents a pin shaft, the head of which is formed from a blank, L, shown in Fig. 8, having equidistant from its center perforations, C′. This blank is folded over the blunt end of the shaft, K, and its sides $l$, brought together so that the openings C′, coincide. Through these openings, C′, a pintle, M, is driven, thus frictionally holding the ears or sides $l$, tight together so that the shaft, K, will not loosen, nor the ears $l$, spread or press outwardly against the outer ears, B, of the joint or setting. The pintle, M, is then placed in the openings, C, and the walls, B, pinched into vertical position as shown in Fig. 7.

It will be observed that the flange, roll, or bead, J, by virtue of its remoteness from the margin of the catch and ears, is continuous around the entire margin of the base plate, A, whereby the plates are strongly united, and no raw edges or irregularities are presented to offend the eye or cut or catch the adjacent fabric. Furthermore, the positioning of the ears, B, in from the plate margin enables the latter when upturned to have their side faces in true parallelism, whereby the pintle is insured of easy insertion, and cramping of the pin tongue head between the ears avoided, as would be the case if the ears rose from the margin of the plate, in which case the surfaces of the ears would be angularly inclined with relation to each other.

What I claim is,

1. In a pin of the type set forth, the combination with a base plate of journal ears cut inwardly from the margin of the plate and extending upwardly from the plate at points remote from the margin of the plate, a catch member also cut inwardly from the margin of the plate and extending upwardly from the plate at a point remote from the margin of the plate, an ornamental front plate, and a flange upon the front plate overlapping the entire margin of the base plate.

2. In a pin of the type set forth, the combination with a base plate, of journal ears upon the plate, a catch member cut inwardly from the margin of the plate, a front plate, and a flange upon the front plate engaging the entire margin of the base plate.

3. In a pin of the type set forth, the combination with a base plate, of journal ears cut inwardly from the margin of the plate and parallel with each other, a catch member upon the plate, a front plate, and a flange upon the front plate engaging the entire margin of the base plate.

4. A pin tongue comprising a shaft, a head formed by folding a blank around the shaft to constitute overlapping ears with contacting inner faces and provided with openings, and a pintle tightly held in the openings to prevent distention of the ears.

5. In a pin of the type set forth, the combination with a base plate, of a catch member cut inwardly from the margin of the plate, a front plate, and a flange upon the front plate overlapping the cut margin of the base plate.

6. In a pin of the type set forth, a blank having integral lateral lugs and a lateral integral ear, said lugs and ear being partially severed from the body of the blank by incisions extending inwardly beyond the outer margin of the blank.

In testimony whereof I have affixed my signature in the presence of two witnesses.

GEORGE W. DOVER.

Witnesses:

HORATIO E. BELLOWS,
GEORGE H. MCLAUGHLIN.